US010528117B2

(12) United States Patent
Gupta et al.

(10) Patent No.: US 10,528,117 B2
(45) Date of Patent: Jan. 7, 2020

(54) THERMAL MITIGATION IN DEVICES WITH MULTIPLE PROCESSING UNITS

(71) Applicant: QUALCOMM Incorporated, San Diego, CA (US)

(72) Inventors: Nikesh Gupta, Telangana (IN); Harshit Tiwari, Telangana (IN); Ashish Bajaj, Telangana (IN); Maheshwar Thakur Singh, Telangana (IN)

(73) Assignee: Qualcomm Incorporated, San Diego, CA (US)

( * ) Notice: Subject to any disclaimer, the term of this patent is extended or adjusted under 35 U.S.C. 154(b) by 1028 days.

(21) Appl. No.: 14/579,660

(22) Filed: Dec. 22, 2014

(65) Prior Publication Data

US 2016/0179180 A1 Jun. 23, 2016

(51) Int. Cl.
| G06F 1/3296 | (2019.01) |
| G06F 1/3287 | (2019.01) |
| H04W 52/02 | (2009.01) |
| G06F 1/20 | (2006.01) |
| G06F 1/3206 | (2019.01) |
| G06F 1/3234 | (2019.01) |

(52) U.S. Cl.
CPC ............ *G06F 1/3287* (2013.01); *G06F 1/206* (2013.01); *G06F 1/3206* (2013.01); *G06F 1/3278* (2013.01); *G06F 1/3296* (2013.01); *H04W 52/0296* (2013.01); *Y02D 10/157* (2018.01); *Y02D 10/16* (2018.01); *Y02D 10/171* (2018.01); *Y02D 10/172* (2018.01); *Y02D 70/00* (2018.01)

(58) Field of Classification Search
CPC .................................................. G06F 1/3287
USPC ........................................................ 713/323
See application file for complete search history.

(56) References Cited

U.S. PATENT DOCUMENTS

| 2005/0228967 A1 | 10/2005 | Hirairi | |
| 2007/0188186 A1 | 8/2007 | Kiryu | |
| 2009/0115258 A1* | 5/2009 | Flynn | H02M 3/156 307/129 |

(Continued)

FOREIGN PATENT DOCUMENTS

| CN | 1906587 A | 1/2007 |
| CN | 103440028 A | 12/2013 |
| JP | 2006133995 A | 5/2006 |

OTHER PUBLICATIONS

International Search Report and Written Opinion—PCT/US2015/060467—ISA/EPO—dated Mar. 31, 2016.

*Primary Examiner* — Jaweed A Abbaszadeh
*Assistant Examiner* — Sumil M Desai
(74) *Attorney, Agent, or Firm* — Haynes and Boone, LLP (57) ABSTRACT

A method of thermal mitigation in a device having a plurality of non-real-time processing units (PUs) and a plurality of real-time PUs, including connecting each of the plurality of real-time PUs and the plurality of non-real-time PUs to a first power supply, and performing thermal mitigation. Performing thermal mitigation includes disconnecting each of the plurality of non-real-time PUs except one of the plurality of non-real-time PUs from the first power supply resulting in an active non-real-time PU, and connecting a second power supply that derives power from the first power supply to the active non-real-time PU, wherein a voltage supplied by the second power supply is less than a voltage supplied by the first power supply.

13 Claims, 4 Drawing Sheets

(56) References Cited

U.S. PATENT DOCUMENTS

| | | |
|---|---|---|
| 2010/0138675 A1 | 6/2010 | Nikazm et al. |
| 2012/0271480 A1 | 10/2012 | Anderson et al. |
| 2013/0162233 A1* | 6/2013 | Marty .................. H02M 3/158 323/274 |
| 2013/0332748 A1* | 12/2013 | Kolla ....................... G06F 1/26 713/300 |
| 2014/0082377 A1 | 3/2014 | Dinh et al. |
| 2014/0189402 A1 | 7/2014 | Conrad et al. |
| 2014/0223205 A1 | 8/2014 | Muthukaruppan et al. |
| 2014/0237267 A1 | 8/2014 | Wang et al. |
| 2015/0106640 A1* | 4/2015 | Brackman ............... G06F 1/206 713/324 |

* cited by examiner

THERMAL MITIGATION IN DEVICES WITH MULTIPLE PROCESSING UNITS

TECHNICAL FIELD

This application relates to thermal mitigation in mobile devices, and more particularly, to thermal mitigation in mobile devices having multiple processing units.

BACKGROUND

Keeping the temperature of a mobile communications and computing device, such as a smartphone or tablet computer, with multiple processing units (PUs) under control is an area of concern for several reasons. One reason is that leakage current in a PU increases as temperature increases, thereby draining battery resources. A second reason relates to device preservation and user safety. For example, in some scenarios temperature can keep increasing to the point that the device not only reaches a point of failure wherein internal circuitry starts to malfunction but the device can also become hot enough to cause discomfort to a user. Accordingly, thermal mitigation is a long-standing issue that seeks to keep device temperature under control while maintaining satisfactory performance.

One technique for performing thermal mitigation is to reduce voltage supplied to one or more PUs in a mobile device. Reducing voltage to a PU reduces power consumption which in turn reduces an amount of heat produced by the PU. A PU may be designed to operate at a lower speed, for example, as voltage is reduced, thus providing for a tradeoff between power consumption and performance.

Digital circuits are usually integrated on semiconductor dies, and several PUs, such as a modem and a multi-core processor, may be present on a single semiconductor die in a mobile device. A system on chip (SoC) refers to multiple PUs embedded on a single die. A PU is a functional block on the SoC. For example, a PU may be a wireless baseband modem, a graphics processing unit (GPU), an image processing unit, a core in a multi-core processor, or other type of processing circuitry.

The PUs in an SoC may encompass a wide variety of functional elements, and thus, their frequency and voltage requirements (e.g., related to desired performance) may differ vastly at any given moment. Therefore, in order to adequately perform thermal mitigation, one or more of these functional blocks may be independently operated such that their respective frequency and voltage values may be appropriately scaled. In general, a voltage source controls the power supplied to a PU, and thus a voltage source is a type of power supply.

However, operating the multiple PUs independently at individual voltages and frequencies may require a plurality of power supplies and corresponding voltage rails. Generally, any number of PUs can be supplied by any number of power supplies. There are at least as many PUs as power supplies, and in some scenarios each PU has its own power supply. The power supplies may be located off the SoC, resulting in excessive cost and/or pin count. A switched mode power supply (SMPS) is one such example. In some conventional mobile device architectures, multiple SMPSs are part of a power management integrated circuit (PMIC).

In other embodiments, at least one of the independent power supplies may be located on the SoC, but the power supplies are sized such that power is supplied to all cores, and as a result occupy a large area of the die. There is therefore a need for mobile device architectures and methods that provide adequate thermal mitigation without incurring excessive penalties for cost or die area.

SUMMARY

Methods, systems, and computer program products for performing thermal mitigation in mobile devices having multiple PUs are disclosed herein. Thermal mitigation generally entails taking one or more temperature measurements of a device and then taking various actions, if needed, in response to the measurements to reduce temperature of the device. One or more actions is performed and then a new temperature measurement is taken, and the process is repeated as needed in a feedback loop.

A new architecture for delivering power to PUs is presented herein, and the new architecture provides for performing new thermal mitigation methods. Embodiments of the new architecture provide flexible, yet low cost ways to tradeoff performance and heat generation in devices having multiple non-real-time PUs. The performance of non-real-time PUs can be tuned to reduce power consumption and the corresponding generation of heat, while at the same time maintaining performance of real-time PUs.

In one embodiment, a method of performing thermal mitigation in a device having a plurality of non-real-time PUs and a plurality of real-time PUs is presented. The method includes connecting each of the plurality of real-time PUs and the plurality of non-real-time PUs to a first power supply, and performing thermal mitigation. Performing thermal mitigation includes disconnecting each of the plurality of non-real-time PUs except one of the plurality of non-real-time PUs from the first power supply resulting in an active non-real-time PU, and connecting a second power supply that derives power from the first power supply to the active non-real-time PU. A voltage supplied by the second power supply is less than a voltage supplied by the first power supply.

In another embodiment, an SoC is disclosed. The SoC includes a voltage rail configured to couple to a first power supply, and a second power supply coupled to the voltage rail and configured to derive power from the first power supply. At least one real-time PU is coupled to the voltage rail via a switch. The SoC further includes a plurality of non-real-time PUs, a first plurality of switches, and a second plurality of switches. Each of the plurality of non-real-time PUs is coupled to the voltage rail via a parallel conductive path, with each parallel conductive path having a first path and a second path. The first path of each parallel connection includes a corresponding switch in the first plurality of switches, and the second path of each parallel connection includes a corresponding switch in the second plurality of switches connected in series with the second power supply.

In yet another embodiment, a device is disclosed. The device includes a first power supply, a plurality of non-real-time PUs, first plurality of switches, a second plurality of switches, a second power supply that derives power from the first power supply, and a real-time PU connected to the first power supply. Each of the first plurality of switches is connected between at least one of the plurality of non-real-time PUs and the first power supply. Each of the second plurality of switches is connected between at least one of the plurality of non-real-time PUs and the second power supply. The device also has a thermal mitigation PU. The thermal mitigation PU is configured to control the first plurality of switches to successively open each of the first plurality of switches in response to successive temperature measurements of the device exceeding a threshold, and control the second plurality of switches to allow only one non-real-time PU to receive power from the second power supply while each of the first plurality of switches is open. The thermal mitigation PU is further configured to receive a first temperature measurement of the device, and in response to the first temperature measurement exceeding the threshold, control the second power supply to reduce the voltage supplied by the second power supply.

In yet another embodiment, a computer program product is disclosed. The computer program product has a computer readable medium tangibly recording computer program logic for performing thermal mitigation in a device having a plurality of non-real-time PUs and a plurality of real-time PUs. The computer program product includes code to perform various actions, including connect each of the plurality of real-time PUs and the plurality of non-real-time PUs to a first power supply, and successively disconnect non-real-time PUs from the first power supply until only one non-real-time PU remains active. There is also code to obtain a first temperature measurement of the device, and determine that the first temperature measurement exceeds a threshold. Furthermore, there is code to, in response to the first temperature measurement exceeding the threshold, connect a second power supply that derives power from the first power supply to the active non-real-time PU, wherein a voltage supplied by the second power supply is lower than a voltage supplied by the first power supply.

DETAILED DESCRIPTION

Non-real-time PUs can be distinguished from real-time PUs for the purpose of thermal mitigation. For example, a degree of control of the non-real-time PUs is provided that is independent of the control of the real-time PUs. Thus, performance of the non-real-time PUs can be controlled in a manner separate from the real-time PUs. In order to reduce temperature of a device, a number of measures are provided which take advantage of the separate control of non-real-time PUs.

Exemplary embodiments may employ one or more of the following measures for mitigating high temperatures in a device. In some embodiments, the non-real-time PUs can be switched off until only one active non-real-time PU remains. The disclosed architectures are flexible to allow any non-real-time PU to be the remaining active PU. Further, the voltage provided to a remaining non-real-time PU can be reduced in order to reduce power consumption and heat generation of the non-real-time PU. Moreover, any active software application running on an active non-real-time PU can be transferred to a non-active and cooler non-real-time PU that is chosen to be made active so that a non-real-time PU that has gotten too hot can be switched off. These measures allow for a device to be cooled by reducing performance of PUs in such a way that user-perceived device performance is not significantly negatively affected. Furthermore, these measures can be implemented at low cost using a relatively small area of an SoC.

Figure 1:
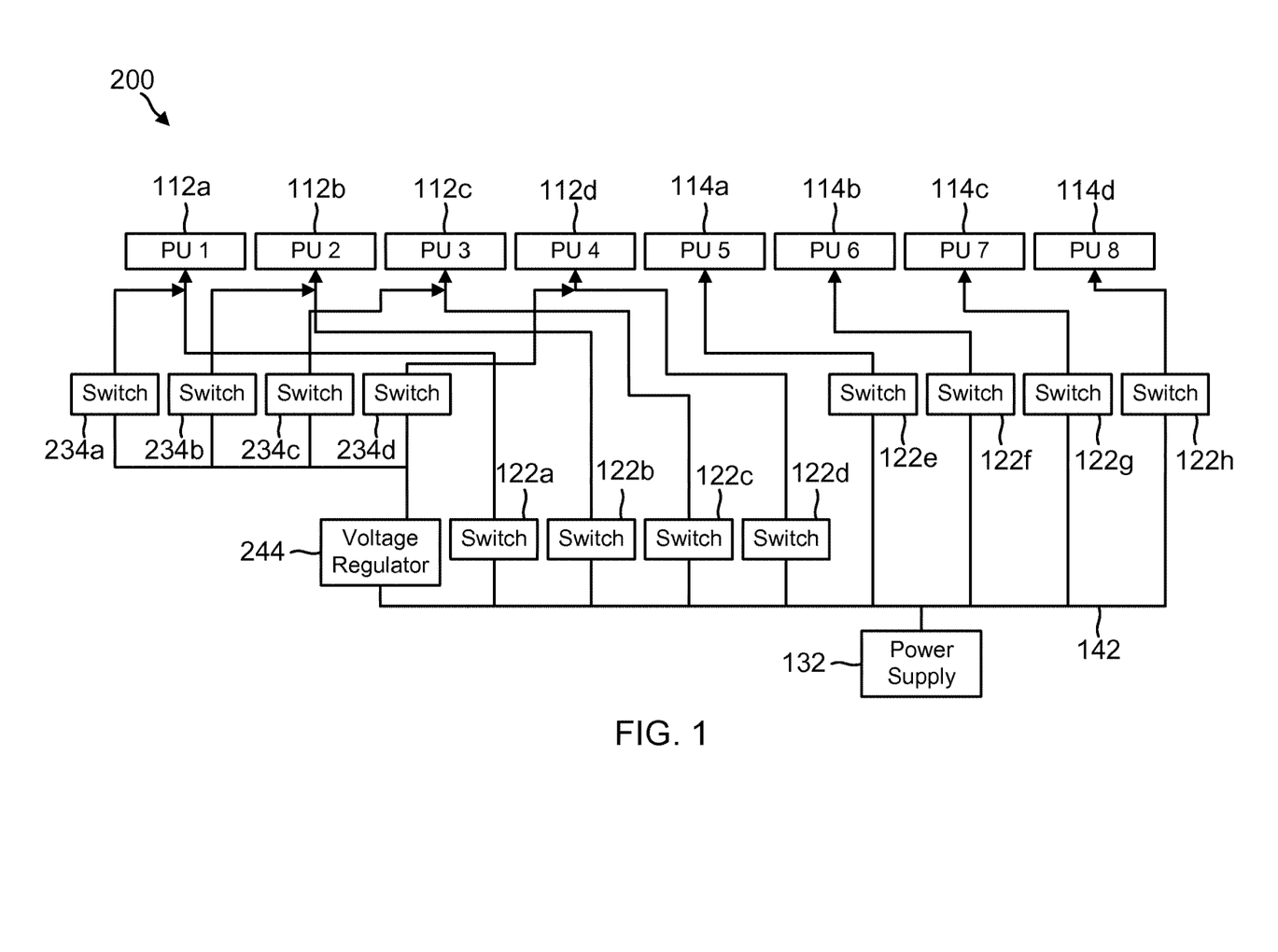
FIG. 1 illustrates digital circuitry comprising a single power supply and a corresponding single supply rail in accordance with an embodiment of the disclosure.

FIG. 1 illustrates an embodiment of digital circuitry 200 having a power supply 132 and a corresponding supply rail 142. The digital circuitry 200 further includes a plurality of PUs 112a-112d coupled to power supply rail 142 via a plurality of corresponding switches 122a-122d, and a plurality of PUs 114a-114d coupled to the power supply rail 142 via a plurality of corresponding switches 122e-122h. A switch 122 allows its corresponding PU 112 or 114 to be disconnected from operation whenever desired, such as during periods when the PU is idle. Even when a PU is idle (but connected to a supply rail) it draws leakage current that consumes power and therefore battery life, so disconnecting the PU from operation via a switch significantly reduces the amount of power consumed and therefore heat generated. In an embodiment, each switch 122 is capable of handling high power from a power supply. For example, each switch may be a type of head switch, such as a global distributed head switch (GDHS) or a block head switch (BHS). Disconnecting or removing a PU from operation temporarily is sometimes referred to as "hot plugging" and reduces the current consumption of the disconnected PU.

Digital circuitry 200 further includes a voltage regulator 244 coupled to the power supply rail 142 as shown in FIG. 1. Thus, power for the voltage regulator 244 is supplied by power supply 132. Voltage regulator 244 provides a way to vary the voltage supplied to one or more PUs 112 in the event that thermal mitigation is performed. The voltage regulator 244 is a second power supply that derives power from the first power supply 132.

Each of PUs 112a-112d has a parallel conductive path to power supply 132. For a given PU 112, a first path of each parallel conductive path includes a switch 122 connected between the PU 112 and the power supply 132 and a second path includes a switch 234 connected in series with the voltage regulator 244. By operating switches on the parallel paths, the power supply 132 can supply power to a PU 112 directly or by way of voltage regulator 244.

Under some circumstances, power supply 132 provides power to PUs 112a-112d via closed switches 122a-122d. In order to mitigate temperature, any of the PUs 112a-112d may be disconnected from power supply 132 by operating the corresponding switch from 122a-122d. For example, in an embodiment, a smartphone includes digital circuitry 200, and PUs 112a through 112d are cores in a quad-core application processor, and PUs 5 114a through 114d are other types of processing units, including a GPU, a wireless communications modem, an image processing unit, or other type of digital signal processor (DSP).

In an embodiment, PUs 114 are real-time PUs, and PUs 112 are non-real-time PUs, and the two types of PUs are treated differently for the purposes of thermal mitigation. A real-time PU generally would significantly impact user experience if performance is reduced to reduce temperature, whereas a non-real-time PU generally would not significantly impact user experience if performance is reduced to reduce temperature. For example, in some embodiments, real-time PUs have timing constraints on when operations should be performed. Furthermore, since real-time PUs generally cannot tolerate significantly reduced performance due to user experience impacts, real-time PUs are not usually implemented with mechanisms (e.g., larger buffers) that would accommodate significantly reduced performance. Also, in some embodiments, real-time PUs have timing requirements from the network side, so even if a real-time PU is equipped with jitter buffers or off-line processing modes to accommodate significantly reduced performance, advantage cannot be taken of these mechanisms because of hard timelines from a protocol and network perspective.

On the other hand, non-real time PUs may not have the above-mentioned limitations. A wireless communications modem and graphics processor are examples of a real-time PU, and each core of a multi-core processor is an example non-real-time PU. There is generally more latitude in thermal mitigation for reducing performance of non-real-time PUs as opposed to real-time PUs.

In a multi-core processor, a software application can execute using a plurality of cores for faster execution. More than one core at a time can execute instructions in parallel so that the application executes more quickly. The fewer the available cores, the more slowly an application will generally execute. The same is true for any application that is able to use a plurality of non-real-time PUs. That is, the fewer available non-real-time PUs, the more slowly an application for the non-real-time PUs will generally execute.

If a temperature reading exceeds a threshold, PUs 112a-112d may be successively shut down via the corresponding switches 122a-122d until the temperature is below a second threshold. Logic to perform thermal mitigation is described in more detail with respect to FIGS. 3 and 4. In one embodiment, one of PUs 112a-112d remains on, despite the hot plugging of the other PUs, to accommodate any applications.

At a given time during execution of an application on a PU, the application may have a memory state of the PU associated with program execution as well as instructions in a queue ready to be executed by the PU. When a PU is shut down or hot plugged, the state of the application instructions (such as a thread or process) running on the PU is saved and application instructions queued to be executed by the PU that is to be shut down are moved to a queue or buffer of another active PU in such a way that the application keeps executing consistently and without crashing. In an embodiment, movement of the instructions from one PU to another may be controlled by a scheduler in the operating system. When the instructions are moved from one PU to another when reducing the number of active PUs, fewer instructions per unit time can be processed leading to reduced performance, while at the same time, fewer PUs leads to reduced heat generation. Thus, there is a trade-off between performance and heat generation when shutting down PUs because fewer active PUs reduces performance but also reduces the generation of heat.

If only one of PUs 112a-112d remains on and the temperature is still too high, voltage regulator 244 is activated to provide power to that PU 112 through an appropriate one of the switches 234a-234d. At that point, voltage regulator 244 can be used to reduce the voltage supplied to the remaining PU 112 in an attempt to further reduce temperature.

If it is desired to reduce the temperature further, PU rotation can be performed in which a different one of PUs 112a-112d is turned on via its corresponding switch 112 and the current one of PUs 112a-112d is switched off via its corresponding switch 112. The extra set of switches 234 allow PU rotation of the PU whose voltage is regulated by the voltage regulator 244. In this example, PU rotation includes the process of selecting and re-selecting an active PU from a multiplicity of PUs.

PU rotation can be accomplished in a manner similar to that described above for shutting down PUs, except that only one PU is powered on and available to execute instructions. In an embodiment, an active PU has corresponding instructions queued and ready to be executed and a current state of the application stored in memory. When a different PU is made active, the instructions are moved to a queue for the new PU and the application state is maintained for the new PU. A device operating system can manage the application during rotation. In the embodiment of FIG. 1, the rotation is managed by switching on only one of switches 234a-234d at a time. The switches 122a-122d are turned off and remain off during PU rotation.

An inactive PU that has been idle for some time may be cooler than the currently active PU. Making an inactive PU newly active and shutting off the currently active PU is a way to reduce temperature of a device. The temperature of the newly active PU may be below a temperature threshold, while the temperature of the active PU that is shut off may be above a temperature threshold. The "rotation" of PUs refers to the pattern of moving the active state or "on state" from one PU to another until temperature is under control.

The rotation may be accomplished in a number of ways. For example, the rotation may be in a predetermined order, such as a round-robin order. For example, the active state may be transferred from PU 112a to PU 112b to PU 112c to PU 112d to PU 112a and so on in a fixed order. Alternatively, the rotation may be in an order determined based on a condition, such as the temperature of the PUs. For example, the coolest PU may be selected to be the next active PU.

In the configuration in FIG. 1, only one power supply 132 is used, instead of two as in some conventional systems, at the expense of an added voltage regulator 244. In an embodiment, the voltage regulator 244 can be placed on an SoC die along with switches 122 and 234 and PUs 112 and 114, with the power supply 132 being located off-die. In an embodiment, the voltage regulator 244 is sized to supply current to only one core at a time. The cost savings of one power supply 132 more than offsets the added cost of the voltage regulator 244. This is due at least in part to the voltage regulator 244 being a different class of voltage regulator than power supply 132 and also the voltage regulator 244 being dimensioned to power only one core.

In an embodiment, the voltage regulator 244 is a low-drop out (LDO) voltage regulator, and the power supply 132 is an SMPS. An LDO voltage regulator is a type of linear regulator that can operate with a small input-to-output differential voltage. An LDO provides high efficiency and low heat dissipation. An SMPS is generally a more complex type of voltage regulator than an LDO. An SMPS typically includes passive components, such as an inductor and a capacitor, not included in an LDO. In an SMPS, a pass transistor is operated in a switching mode instead of a linear mode, as in an LDO. Thus, in an SMPS a pass transistor is either in an on state or an off state. Due to its smaller area and lack of passive components, generally an LDO can more readily be implemented in an SoC than can an SMPS.

Figure 2:
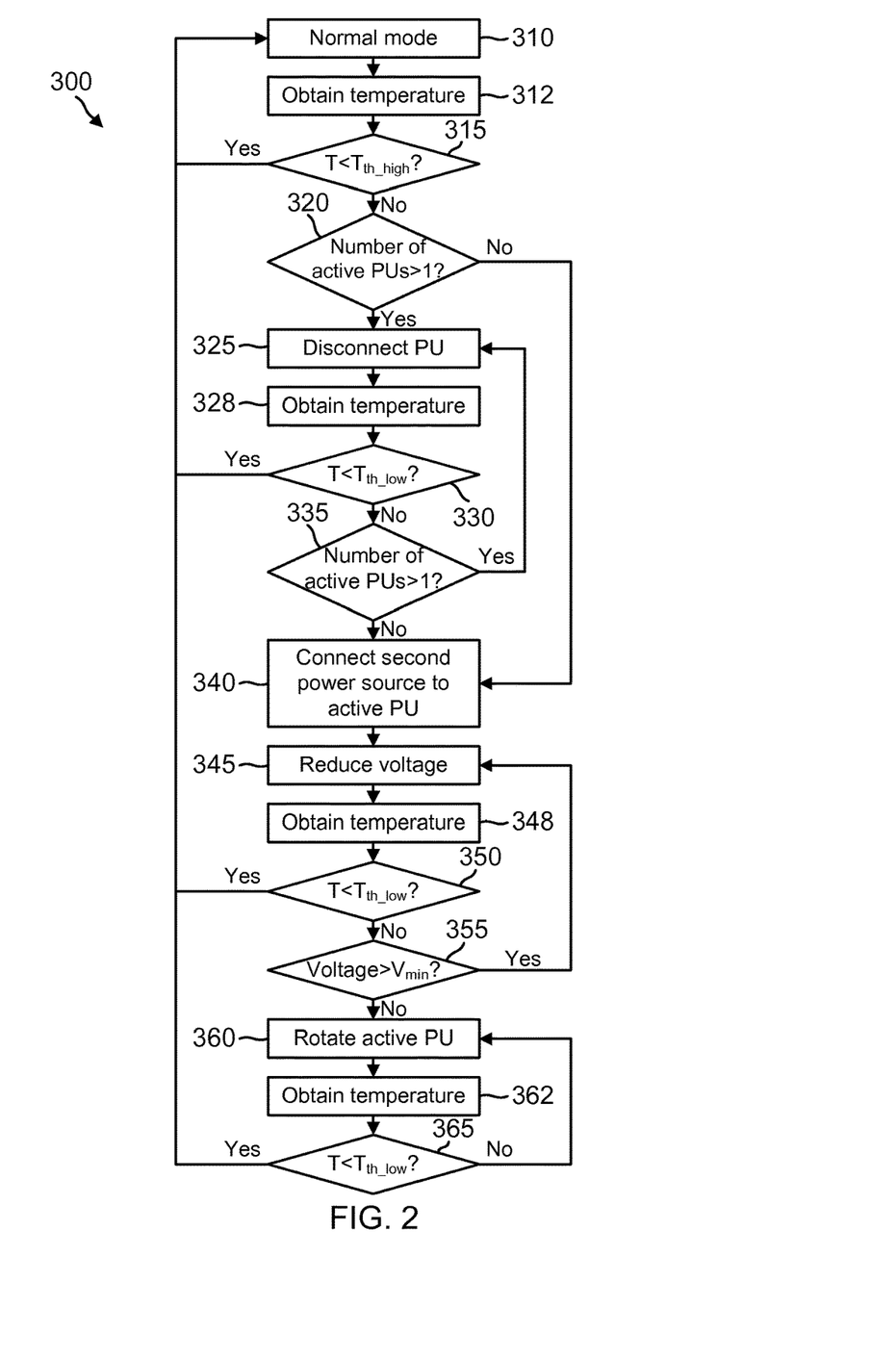
FIG. 2 illustrates a method of performing thermal mitigation in accordance with an embodiment of the disclosure.

A flow diagram of an example method 300 of performing thermal mitigation using digital circuitry, such as digital circuitry 200, is shown in FIG. 2. FIG. 2 is described with reference to FIG. 3, which illustrates an embodiment of a device 400 including the components illustrated in FIG. 1 together with one or more thermal sensors 412, a PU 422, and memory 432. The device includes an SoC 402 and power supply 132. The SoC 402 does not include the power supply 132, although in other embodiments the power supply 132 may be integrated into the SoC 402. The SoC 402 is configured to couple to a power supply, such as power supply 132. In an embodiment, the SoC 402 includes a multi-core processor having a plurality of cores represented by PUs 112a-112d.

Figure 3:
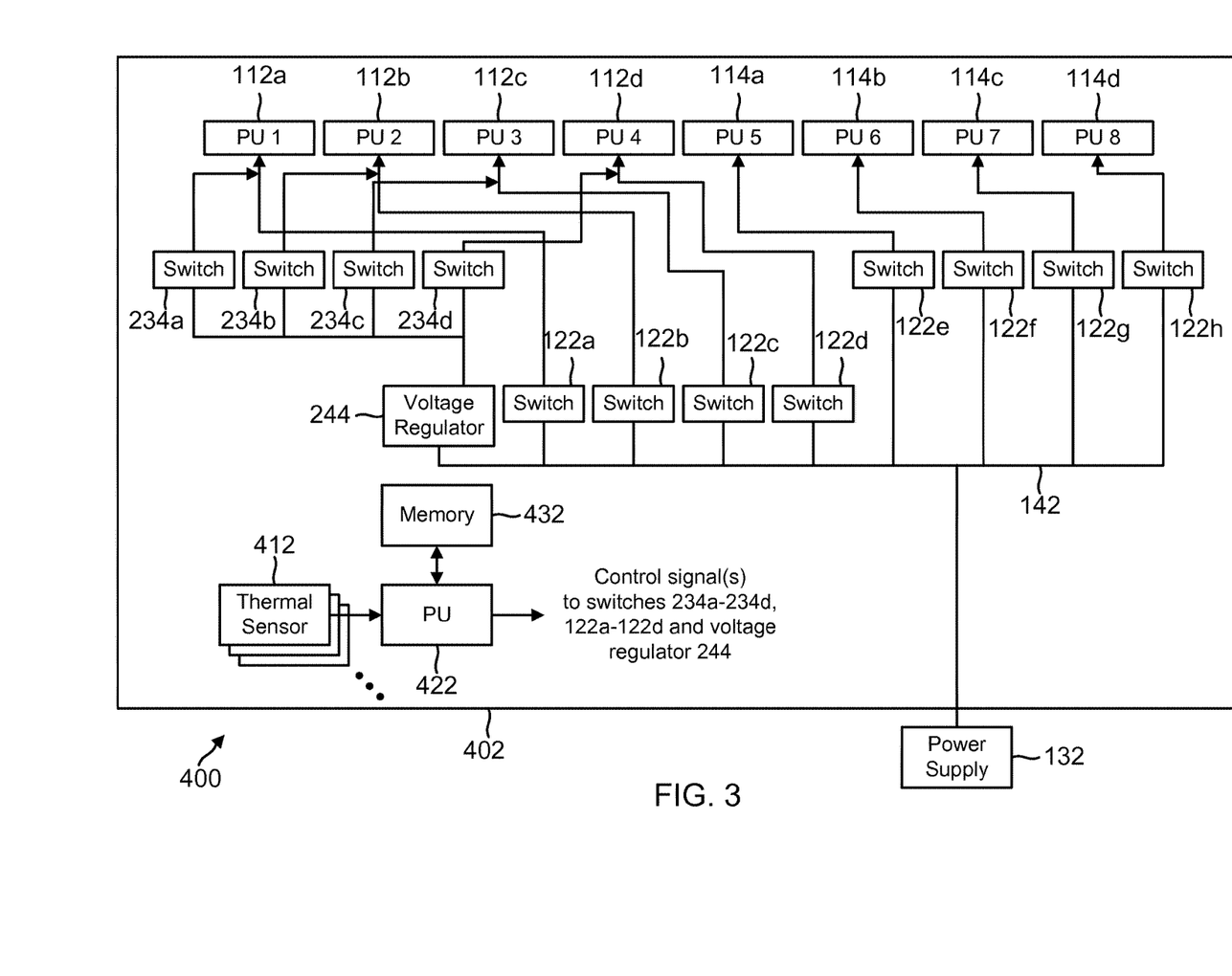
FIG. 3 illustrates a device in accordance with an embodiment of the disclosure.

The one or more thermal sensors 412 provide an indication, either directly or indirectly, of temperature at one or more locations on the device 400. In one example, there may be one thermal sensor 412 that provides a measure of temperature for a chosen location on the SoC 402. In another example, there may be a plurality of thermal sensors 412, each of which provides a measure of temperature for a corresponding location on the SoC 402. If temperature measurements of a plurality of locations are collected, the method 300 may use the average temperature or some other statistical measure of temperature in decision blocks.

The one or more thermal sensors 412 communicate at least one signal indicating temperature to a PU, such as PU 422. The PU 422 implements one or more actions in response to the temperature indication in order to affect temperature of the device 400. The thermal sensors 412 together with PU 422 may be viewed as implementing a feedback loop in which the PU 422 keeps track of temperature and performs thermal mitigation as appropriate.

The memory 432 may be any electronic component capable of storing information and/or instructions. For example, the memory 432 may include random access memory (RAM), read-only memory (ROM), flash memory devices in RAM, optical storage media, erasable programmable read-only memory (EPROM), registers, or combinations thereof. In an embodiment, the memory 432 is a non-transitory computer-readable medium. Instructions or code may be stored in the memory 432 that are executable by the PU 422 to implement the method 300. The PU 422 may be referred to herein as a thermal mitigation PU. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

In this example, instructions for implementing the method 300 may be executed in the PU 422. The PU 422 is coupled to switches 232 and 234 and controls the states of the switches via one or more control signals. The PU 422 is also coupled to the voltage regulator 244 to control the voltage provided by the voltage regulator 244. In an alternative embodiment (not illustrated in FIG. 3), one of the PUs 112 is designated as implementing the method 300, in which case the PU 112 that implements the method 300 remains connected to power supply 132 at all times and is not considered as part of the thermal mitigation method 300 itself.

The example method 300 begins in block 310 in which the device 400 is in normal mode. Normal mode is a device state in which no thermal mitigation is being performed. A device in normal mode measures temperature at one or more locations on the device at predetermined time intervals (e.g., one measurement per minute, per 10 seconds, or per second). In block 310 each of the switches 222 and 232 are closed so that each of the PUs 112 and 114 are connected to the power supply 132, and each of the switches 234 are open. Thus, the power supply 132 is providing power directly to each of the PUs 112 and 114.

A temperature measurement of the device 400 is obtained in block 312. The temperature measurement may be performed by one or more thermal sensors 412, with the temperature measurement provided to a PU, such as PU 422. If more than one temperature measurement is taken, the measurements may be averaged or any other statistical measure may be used to produce a single number or multiple numbers referred to as the temperature measurement.

A determination is made in block 315 whether the temperature measurement T is less than a threshold $T_{th\_high}$. If the temperature measurement T is less than threshold $T_{th\_high}$ thermal mitigation is not needed, and the method remains in normal mode 310. Otherwise, thermal mitigation is commenced, and the method 300 proceeds to decision block 320 in which an active number of PUs 112 is determined among a plurality of PUs 112. In an embodiment, an active PU is both connected to power and is not idle (e.g., is executing application instructions). For example, the PUs 112 are cores in a multi-core processor or any other type of non-real-time PU, whereas the PUs 114 are real-time PUs that stay connected to power supply 132

If the number of active PUs 112 is greater than 1, the method 300 proceeds to block 325 in which an active PU 112 is disconnected or hot plugged by opening or shutting off its corresponding switch 232. As part of disconnecting an active PU 112, the method 300 may further include saving the processing state of the active PU 112 and transferring its state to a remaining active PU 112 to allow the remaining active PU 112 to take over processing. The method 300 may further include moving the instructions that are buffered for the active PU 112 to be shut down to a buffer or queue for a selected active PU 112 to take over processing these instructions.

In an embodiment, the PU 422 generates one or more control signals coupled to switches 122 to open any selected switches of switches 122a-122d in order to disconnect a PU 112. A predetermined period of time after the PU 112 is disconnected, the temperature T of the device is obtained in block 328 from sensors 412 and compared, by PU 422, to a second threshold $T_{th\_low}$ in decision block 330. If T is less than $T_{th\_low}$ then PU 422 returns the device 400 to its normal mode 310 by opening all switches 234 and closing all switches 122. However, if T is not less than $T_{th\_low}$ the method proceeds to decision block 335. In an embodiment, the thresholds satisfy $T_{th\_high} > T_{th\_low}$ to help prevent the method 300 from oscillating between the normal mode and thermal mitigation.

In decision block 335 a number of active PUs 112 is determined by PU 422. If the number of active PUs 112 is greater than 1 then the method returns to block 325. If the number of active PUs 112 is equal to 1, then the method proceeds to block 340. Thus, in the series of actions or blocks 325 through 335, PUs 112 are successively disconnected from the power supply 132 until only one PU 112 is active or connected to the power supply 132. At that point, PU 422 takes other measures for thermal mitigation starting in block 340.

In block 340 a second power supply is connected to the active PU. In this example, the second power supply is the voltage regulator 244, and the voltage regulator 244 is connected to the active PU 112 by switching off the only remaining one of switches 122a-122d that is still on and switching on a switch in switches 234a-234d that corresponds to the active PU 112. Each PU 112a-112 has two parallel conductive paths to power supply 132. Using PU 112a as an example PU, one conductive path includes switch 234a in series with voltage regulator 244, and the other conductive path includes switch 122a. Thus, if PU 112a is the only remaining active PU, to connect the second power supply 244 to PU 112a, switch 122a is switched off and switch 234a is switched on.

The second power supply derives its power from a first power supply. For example, the voltage regulator 244 derives its power from power supply 132. By limiting the number of active PUs to a single PU, the voltage regulator 244 can be dimensioned to supply power to only a single PU thereby resulting in a voltage regulator 244 that occupies a small area of a die.

After the second power supply is engaged, the voltage supplied to the active PU is reduced in block 345. After a period of time has elapsed to allow the voltage reduction to effect a change in temperature, the temperature is obtained in block 348. The temperature T is compared against a threshold $T_{th\_low}$ in decision block 350. If the temperature T is less than $T_{th\_low}$ the method 300 returns to block 310 in which the device 400 is returned to normal mode. Otherwise, if T is not less than $T_{th\_low}$, then the method 300 proceeds to decision block 355. In decision block 355 the voltage supplied by the second power supply is compared against a minimum voltage $V_{min}$. In an embodiment, $V_{min}$ represents the lowest voltage in which a connected PU 112 can remain active. If the voltage exceeds $V_{min}$ then the method returns to block 345. If the voltage does not exceed $V_{min}$ then voltage cannot be reduced further and the method 300 proceeds to block 360. Thus, in the thermal mitigation method 300 voltage supplied to the last remaining active PU 112 is reduced for thermal mitigation purposes until voltage cannot be reduced further. At that point, other measures are taken for thermal mitigation.

In block 360, the workload executed by the active PU 112 is transferred to an idle PU 112. The next PU 112 to be the active PU can be selected in any appropriate manner. For example, the algorithm may include a set order of PUs when switching from PU to PU. Alternatively, there may be a thermal sensor associated with each PU 112 to measure a temperature of each PU 112, and the PU 112 with the lowest temperature is selected to be the active PU. The temperature T is obtained in block 362 and compared against threshold $T_{th\_low}$ in decision block 365. If T is less than $T_{th\_low}$, then the method returns to block 310 and the device 400 returns to normal mode. If T is not less than $T_{th\_low}$, then the method returns to block 360 and a new active PU 112 is selected.

As described earlier, the process of selecting and reselecting an active PU is referred to as PU rotation. In an embodiment in which a PU 112 represents a core in a multi-core processor, this process is referred to as core rotation. Essentially, an "on status," or having only one of the switches 234 closed (while all switches 232 are open) to couple one PU 112 to voltage regulator 244, is rotated among the PUs 112 to reduce temperature. Thus, the "on status" may be passed from one PU to a subsequent PU (and on and on, if appropriate) to keep temperature of the device 400 below an appropriate threshold.

The scope of the embodiments is not limited to the specific method 300 illustrated in FIG. 2. Other embodiments may add, omit, rearrange, or modify one or more actions. For example, the PU rotation blocks of 360-365 may be performed prior to voltage reduction blocks 345-355, instead of the other way around. Rotation of the active PU can first be attempted to reduce temperature by performing a certain number of transfers of the active status before the method 300 turns to voltage reduction. If temperature is not reduced sufficiently after a certain number of transfers, the method 300 may then move on to attempt to reduce temperature sufficiently by reducing voltage supplied to the remaining active PU. The number of PUs and corresponding switches in FIG. 3 is exemplary, and the principles of this disclosure may be scaled as appropriate to cover architectures with any number of PUs and switches.

It is understood that by programming and/or loading executable instructions onto the device 400, at least one of the PU 422 and/or the memory 432 are changed, transforming the device 400 in part into a particular machine or apparatus having the functionality taught by the present disclosure. The executable instructions may be stored on the memory 432 and loaded into the PU 422 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain.

Figure 4:
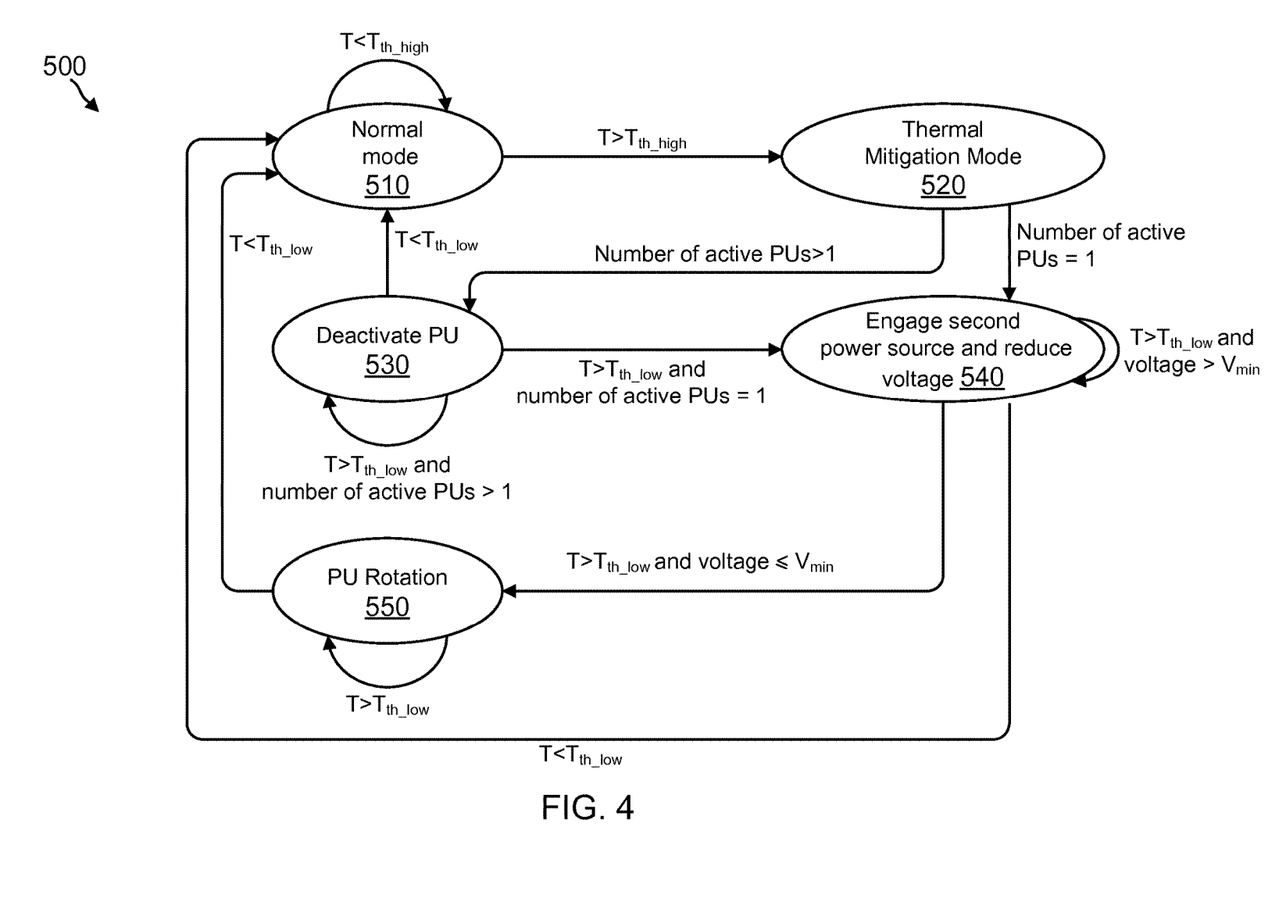
FIG. 4 is a state diagram illustrating multiple thermal mitigation states of a device.

FIG. 4 is a state diagram 500 illustrating multiple thermal mitigation states of a device, such as device 400. The state diagram 500 provides a framework for further explaining the method 300. The states represent thermal mitigation logic implemented by a controlling PU, such as PU 422. The normal mode 510 corresponds to block 310 in method 300. When the normal mode 510 is exited due to a measured temperature T exceeding a threshold $T_{th\_high}$, the device enters thermal mitigation mode 520.

From state 520, the next state depends on the number of active PUs. If the number of active PUs is greater than one then the device 400 goes to state 530, whereas if the number of active PUs equals 1 the device 400 goes to state 540. State 530 corresponds to blocks 325 through 335 of the method 300, and state 540 corresponds to blocks 345 through 355 of the method 300. If at any time the temperature T is less than $T_{th\_low}$, the device 400 will move back to the normal mode of operation in state 510.

In state 530, the PUs are hot-plugged one by one either until the temperature is below $T_{th\_low}$ or until there is only one active PU. If there is only one active PU, then the state transitions to state 540, in which the second power supply 244 is engaged and voltage is reduced until either the temperature is less than $T_{th\_low}$ or until the supplied voltage is a minimum. If the temperature still is not less than $T_{th\_low}$, then PU rotation is performed in state 550. State 550 corresponds to blocks 360 through 365 in method 300.

A number of thermal mitigation measures are disclosed herein. These measures allow for a device to be cooled by reducing performance of PUs in such a way that user-perceived device performance is not significantly negatively affected. Furthermore, these measures can be implemented at low cost using a small area of a die.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A system on chip (SoC) comprising:
   a voltage rail configured to couple to a first power supply;
   a second power supply coupled to the voltage rail and configured to derive power from the first power supply;
   at least one real-time processing unit (PU) coupled to the voltage rail via a switch;

a plurality of non-real-time PUs;
a first plurality of switches; and
a second plurality of switches, wherein each of the plurality of non-real-time PUs is coupled to the voltage rail via a parallel conductive path, wherein a first path of each parallel conductive path comprises a corresponding switch in the first plurality of switches, and wherein a second path of each parallel conductive path comprises a corresponding switch in the second plurality of switches coupled in series with the second power supply.

2. The SoC of claim 1, wherein in a first thermal mitigation state each of the first plurality of switches is configured to be open and only one of the second plurality of switches is configured to be closed to connect the second power supply to only one of the non-real-time PUs.

3. The SoC of claim 2, wherein the second power supply is configured to supply voltage to only one of the plurality of non-real-time PUs at a time.

4. The SoC of claim 1, wherein the first power supply comprises a switched-mode power supply, and wherein the second power supply comprises a low-drop out voltage regulator.

5. The SoC of claim 4, wherein each of the plurality of non-real-time PUs is a core in a multi-core processor, and wherein the real-time PU is a wireless modem.

6. The SoC of claim 2, wherein a voltage supplied by the second power supply is variable to vary the performance of the one of the non-real-time PUs.

7. The SoC of claim 2, further comprising a PU configured to:
receive a first temperature measurement of the device;
determine that the first temperature measurement exceeds a threshold; and
in response to determining that the first temperature measurement exceeds the threshold, send a control signal to the second power supply to reduce the voltage supplied by the second power supply.

8. A device comprising:
a first power supply;
a plurality of non-real-time processing units (PUs);
a first plurality of switches, each of which is coupled between at least one of the plurality of non-real-time PUs and the first power supply;
a second power supply that derives power from the first power supply;
a second plurality of switches, each of which is coupled between at least one of the plurality of non-real-time PUs and the second power supply;
a real-time PU connected to the first power supply; and
a thermal mitigation PU configured to:
control the first plurality of switches to successively open each of the first plurality of switches in response to successive temperature measurements of the device exceeding a threshold;
control the second plurality of switches to allow only one non-real-time PU to receive power from the second power supply at a time while each of the first plurality of switches is open;
a) receive a first temperature measurement of the device; and
b) in response to the first temperature measurement exceeding the threshold, control the second power supply to reduce the voltage supplied by the second power supply.

9. The device of claim 8, wherein the thermal mitigation PU is configured to repeat (a) and (b) until either a voltage supplied by the second power supply is less than or equal to a minimum voltage or one of the first temperature measurements is less than the threshold.

10. The device of claim 9, wherein the thermal mitigation PU is further configured to:
in response to the second power supply supplying a voltage that is less than or equal to the minimum voltage,
c) receive a second temperature measurement of the device; and
d) in response to the second temperature measurement exceeding the threshold, control the second plurality of switches to rotate which non-real-time PU receives power from the second power supply.

11. The device of claim 10, wherein the thermal mitigation PU is further configured to repeat (c) and (d) until one of the second temperature measurements is less than the threshold.

12. The device of claim 8, wherein the first power supply comprises a switched-mode power supply, and wherein the second power supply comprises a low-drop out voltage regulator.

13. The device of claim 12, wherein each of the plurality of non-real-time PUs comprises a core in a multi-core processor, and wherein the real-time PU comprises a wireless modem.

* * * * *